(12) United States Patent
Chai

(10) Patent No.: US 10,383,015 B2
(45) Date of Patent: Aug. 13, 2019

(54) ACCESS METHOD, APPARATUS, AND SYSTEM

(71) Applicant: Huawei Technologies Co., Ltd., Shenzhen (CN)

(72) Inventor: Li Chai, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 15/985,470

(22) Filed: May 21, 2018

(65) Prior Publication Data

US 2018/0270719 A1 Sep. 20, 2018

Related U.S. Application Data

(63) Continuation of application No. PCT/CN2016/106810, filed on Nov. 22, 2016.

(30) Foreign Application Priority Data

Nov. 23, 2015 (CN) .......................... 2015 1 0818013

(51) Int. Cl.
*H04W 16/28* (2009.01)
*H04W 24/10* (2009.01)
*H04W 36/00* (2009.01)
*H04W 36/04* (2009.01)
*H04W 36/08* (2009.01)
(Continued)

(52) U.S. Cl.
CPC ........... *H04W 36/04* (2013.01); *H04W 16/28* (2013.01); *H04W 36/00* (2013.01); *H04W 36/0011* (2013.01); *H04W 36/0088* (2013.01); *H04W 36/18* (2013.01); *H04W 36/24* (2013.01); *H04W 48/16* (2013.01); *H04W 24/10* (2013.01); *H04W 36/08* (2013.01)

(58) Field of Classification Search
CPC ............................. H04W 36/04; H04W 16/28
See application file for complete search history.

(56) References Cited

U.S. PATENT DOCUMENTS

2007/0015514 A1 1/2007 Bishop
2011/0306324 A1 12/2011 Jang et al.
(Continued)

FOREIGN PATENT DOCUMENTS

| CN | 103796283 A | 5/2014 |
|----|-------------|--------|
| CN | 104038983 A | 9/2014 |
| CN | 104735678 A | 6/2015 |

*Primary Examiner* — Diane D Mizrahi
(74) *Attorney, Agent, or Firm* — Slater Matsil, LLP

(57) ABSTRACT

An embodiment method includes: configuring, by a network device, at least one micro cell for terminal device or a terminal device group in which the terminal device is located. The at least one micro cell provides a service for only the terminal device or the terminal device group. The method further includes maintaining connection(s) between the at least one micro cell and the terminal device based on configuration information of the at least one micro cell after the terminal device accesses the at least one micro cell. In the access method, the terminal device can access the at least one micro cell that provides a service for only the terminal device, and the network device maintains the connection between the at least one micro cell and the UE based on the configuration information after the terminal device accesses the at least one micro cell.

20 Claims, 6 Drawing Sheets

(51) Int. Cl.
*H04W 36/18* (2009.01)
*H04W 36/24* (2009.01)
*H04W 48/16* (2009.01)

(56) References Cited

U.S. PATENT DOCUMENTS

2015/0131750 A1    5/2015    Xue et al.
2016/0021548 A1*   1/2016    Raghavan ............. H04W 16/28
                                                                   370/329

\* cited by examiner us 10,383,015 b2

ACCESS METHOD, APPARATUS, AND SYSTEM

CROSS-REFERENCE TO RELATED APPLICATIONS

This application is a continuation of International Application No. PCT/CN2016/106810, filed on Nov. 22, 2016, which claims priority to Chinese Patent Application No. 201510818013.4, filed on Nov. 23, 2015. The disclosures of the aforementioned applications are hereby incorporated by reference in their entireties.

TECHNICAL FIELD

This application relates to the field of wireless communications technologies, and in particular, to a method for accessing a wireless communications system, an apparatus, and a system.

BACKGROUND

Currently, in a wireless communications network such as a Universal Mobile Telecommunications System (UMTS) or Long Term Evolution (LTE), a terminal device can be connected only to one cell, and the cell is referred to as a serving cell of the UE. One base station may usually have one or more cells. Each cell has a specific coverage area, and the coverage area is relatively fixed. If the UE leaves a current cell and enters another cell in a moving process, the terminal device (e.g., the UE) is handed over to the another cell based on an existing mobility management technology.

For example, as shown in FIG. 1, an existing handover procedure usually includes the following steps.

Step 101: A terminal device starts neighboring cell measurement, and reports a neighboring cell measurement result to a serving base station using a measurement report.

Step 102: The serving base station determines a suitable target cell based on the neighboring cell measurement result, and sends a handover request message to a target base station corresponding to the target cell.

Step 103: After determining, based on a resource status of the cell, to accept the UE, the target base station sends a handover acknowledgment message to the serving base station.

Step 104: The serving base station sends a handover command to the terminal device.

Step 105: The terminal device is handed over to the target cell based on the handover command, and returns a handover acknowledgment message to the target base station.

It is known to all that the foregoing handover procedure may cause transmission interruption of user plane data of the terminal device and an increase of a large amount of handover signaling.

In addition, as cell deployment density and complexity sharply increase, it is correspondingly more difficult to predict inter-cell interference distribution. Therefore, a handover procedure failure due to a radio link failure caused by interference also increases substantially, and consequently a service of the UE is interrupted due to a handover failure, and user experience is relatively poor.

Therefore, how to avoid, as much as possible, transmission interruption of user information and an increase of a large amount of handover signaling due to frequent inter-cell handover is a problem urgently to be resolved in the industry.

SUMMARY

In view of this, this application provides an access method, an apparatus, and a system, to avoid, as much as possible, transmission interruption of user information and an increase of a large amount of handover signaling due to frequent inter-cell handover.

According to one aspect, this application provides an access method, applicable to a wireless communications system that provides a service for a terminal device. The method includes: configuring, by a network device, micro cell(s) for the terminal device or a terminal device group in which the terminal device is located. The micro cell(s) provide a service for only the terminal device or the terminal device group. The quantity of the micro cell(s) is N, and N is a natural number greater than or equal to 1. The method further includes maintaining, by the network device, connection(s) between the micro cell(s) and the terminal device based on configuration information of the micro cell(s) after the terminal device accesses the micro cell(s).

Optionally, the configuring, by a network device, micro cell(s) for the terminal device or the terminal device group may include configuring, by the network device, the micro cell(s) based on obtained information, and sending the configuration information of the micro cell(s) to the terminal device or the terminal device group.

Optionally, the configuring, by the network device, the micro cell(s) based on obtained information may include determining, by the network device, receiving and sending sectors of the micro cell(s) based on the obtained information by means of sector scanning. The sector scanning is implemented by using at least one of the following items: interaction that is between the network device and the terminal device or the terminal device group and that is of at least one piece of the following sector-related information: a control frame, a data frame, a sequence, a reference signal, a measurement result of a sequence, or a measurement result of a reference signal. Additionally or alternatively, the configuring, by the network device, the micro cell(s) based on obtained information includes determining, by the network device, beamforming(s) of the micro cell(s) based on the obtained information by using a beam training process, and determining, by the network device in the beam training process, receiving and sending beamforming(s) of the micro cell(s) by using at least one of the following items interaction that is between the network device and the terminal device or the terminal device group and that is of at least one piece of the following beamforming-related information: a control frame, a data frame, or a sequence; measurement results that are of a reference signal and/or a sequence related to beamforming and that are fed back by the terminal device or the terminal device group; or measurement results obtained after the network device measures a reference signal and/or a sequence related to beamforming.

Optionally, the method may further include performing, by the network device, configuration update on the micro cell(s) based on the obtained information, and keeping, by the network device, a parameter used to trigger a handover procedure unchanged.

Optionally, the performing, by the network device, configuration update on the micro cell(s) based on the obtained information may include updating, by the network device, the receiving and sending sectors of the micro cell(s) based on the obtained information by means of sector scanning. The sector scanning is implemented by using at least one of the following items: interaction that is between the terminal device or the terminal device group and the network device and that is of at least one piece of the following sector-related information: a control frame, a data frame, a sequence, a reference signal, a measurement result of a sequence, or a measurement result of a reference signal. Alternatively or additionally, the performing, by the network device, configuration update on the micro cell(s) based on the obtained information includes updating, by the network device, the beamforming(s) of the micro cell(s) based on the obtained information by using a beam training process, and updating, by the network device in the beam training process. The receiving and sending beamforming(s) of the micro cell(s) by using at least one of the following items interaction that is between the network device and the terminal device or the terminal device group and that is of at least one piece of the following beamforming-related information: a control frame, a data frame, or a sequence; measurement results that are of a reference signal and/or a sequence related to beamforming and that are fed back by the terminal device or the terminal device group; or measurement results obtained after the network device measures a reference signal and/or a sequence related to beamforming.

Optionally, the method further includes at least one of the following steps: after the terminal device has no service, continuing, by the network device, to store context information of the terminal device, and after determining that the terminal device has a service, using the context information to process the service for the terminal device; after determining that the terminal device has no service, enabling, by the network device, the terminal device to camp on the micro cell(s); or after determining that the terminal device has no service and camps on the micro cell(s), minimizing, by the network device, transmit power(s) of the micro cell(s), and after determining that the terminal device has a service, restoring the transmit power(s) of the micro cell(s).

Optionally, the network device may include a first network device and a second network device, the first network device is corresponding to a first micro device, micro cell(s) that can be provided by the first micro device is corresponding to a first coverage area, the second network device is corresponding to a second micro device, micro cell(s) that can be provided by the second micro device is corresponding to a second coverage area, and the first network device configures the micro cell(s) for the terminal device and the terminal device group in which the terminal device is located, and provides the micro cell(s) for the terminal device by using the first micro device.

The maintaining, by the network device, connection(s) between the micro cell(s) and the terminal device based on configuration information of the micro cell(s) after the terminal device accesses the micro cell(s) includes: after the terminal device accesses the micro cell(s), and the first network device determines that the terminal device moves from the first coverage area to the second coverage area, sending, by the first network device, information about the terminal device and information about the micro cell(s) to the second network device. The maintaining, by the network device, connection(s) between the micro cell(s) and the terminal device further includes configuring, by the second network device, the micro cell(s) for the terminal device based on the information about the terminal device and the information about the micro cell(s), providing the micro cell(s) for the terminal device by using the second micro device, keeping the parameter used to trigger a handover procedure unchanged, and maintaining the connection(s) between the micro cell(s) and the terminal device based on the configuration information of the micro cell(s). Alternatively or additionally, the maintaining, by the network device, connection(s) between the micro cell(s) and the terminal device based on configuration information of the micro cell(s) after the terminal device accesses the micro cell(s) includes: after the terminal device accesses the micro cell(s), and the second network device determines that the terminal device moves into the second coverage area, obtaining, by the second network device, information about the terminal device and information about the micro cell(s) from the first network device based on information received from the terminal device; and configuring, by the second network device, the micro cell(s) for the terminal device based on the information about the terminal device and the information about the micro cell(s), providing the micro cell(s) for the terminal device by using the second micro device, keeping the parameter used to trigger a handover procedure unchanged, and maintaining the connection(s) between the micro cell(s) and the terminal device based on the configuration information of the micro cell(s).

Optionally, the configuring, by the second network device, the micro cell(s) for the terminal device based on the information about the terminal device and the information about the micro cell(s), providing the micro cell(s) for the terminal device by using the second micro device, and keeping the parameter used to trigger a handover procedure unchanged includes: before the terminal device enters the second coverage area of the second micro device, configuring, by the second network device for the terminal device based on the information about the terminal device and the information about the micro cell(s), micro cell(s) that can ensure service continuity of the terminal device, providing the micro cell(s) for the terminal device by using the second micro device, and keeping the parameter used to trigger a handover procedure unchanged; and after the terminal device enters the coverage area of the second micro device, performing, by the second network device, configuration update on the micro cell(s) based on a measurement result reported by the terminal device or a result obtained after the second micro device measures a signal of the terminal device, and keeping the parameter used to trigger a handover procedure unchanged.

Optionally, the network device may include a third network device, the third network device is corresponding to a third micro device and a fourth micro device, micro cell(s) that can be provided by the third micro device is corresponding to a third coverage area, micro cell(s) that can be provided by the fourth micro device is corresponding to a fourth coverage area, and the third network device configures the micro cell(s) for the terminal device by using the third micro device.

The maintaining, by the network device, connection(s) between the micro cell(s) and the terminal device based on configuration information of the micro cell(s) after the terminal device accesses the micro cell(s) includes: after the terminal device accesses the micro cell(s), and the third network device determines that the terminal device moves from the third coverage area to the fourth coverage area, or determines that the terminal device moves into the fourth coverage area, configuring, by the third network device, the micro cell(s) corresponding to the fourth coverage area for the terminal device based on information about the terminal device and information about the micro cell(s), providing the micro cell(s) for the terminal device by using the fourth micro device, keeping the parameter used to trigger a handover procedure unchanged, and maintaining the connection(s) between the micro cell(s) and the terminal device based on the configuration information of the micro cell(s).

Optionally, the first network device and the second network device are macro base stations or controllers, and the first micro device and the second micro device are micro base stations or antenna clusters; the first network device and the second network device are micro base stations or controllers, and the first micro device and the second micro device are antenna clusters; the third network device is a macro base station or a controller, and the third micro device and the fourth micro device are micro base stations or antenna clusters; the third network device is a micro base station or a controller, and the third micro device and the fourth micro device are antenna clusters.

Optionally, the network device includes a macro base station, the macro base station provides a macro cell, and the terminal device camps on the macro cell when there is no service to trigger the terminal device.

The method further includes: when the terminal device has a service, sending, by the macro base station, the configuration information of the micro cell(s) to the terminal device.

Optionally, before the terminal device accesses the micro cell(s), the network device sends the configuration information of the micro cell(s) to the terminal device or the terminal device group, where the configuration information includes at least one of the following items: a configuration parameter of a common feature of micro cells covered by the network device, access information of a common feature of the micro cells, or access information of each of the micro cells.

According to another aspect, this application provides another access method, applicable to a wireless communications system, where the method includes accessing, by a terminal device, micro cell(s) based on configuration information of the micro cell(s), where the micro cell(s) are micro cell(s) configured for the terminal device or a terminal device group in which the terminal device is located, and the micro cell(s) provide a service for only the terminal device or the terminal device group; and after accessing the micro cell(s), maintaining, by the terminal device, a connection between the terminal device and the micro cell(s) based on the configuration information of the micro cell(s).

Optionally, the method may further include: exchanging, by the terminal device, first information with a network device, where the first information is sector-related and includes at least one of a control frame, a data frame, a sequence, a reference signal, a measurement result of a sequence, or a measurement result of a reference signal. The exchanging first information includes: receiving first information sent by the network device by using a plurality of sectors in a selectable area of the network device, determining, based on the received first information, a sector in which the network device has best sending performance, and sending first information related to the sector with best sending performance and/or an identifier of the sector with best sending performance to the network device; and/or the exchanging first information includes: sending, by the terminal device, first information to a plurality of sectors of the network device by using a plurality of sectors in a selectable area of the terminal device or by using a sector in which the network device has best sending performance, and receiving first information related to a receiving sector of the network device and/or an identifier of a receiving sector of the network device that are/is sent by the network device after determining the receiving sector based on the first information.

Optionally, the method may further include: exchanging, by the terminal device, second information with the network device, where the second information is beamforming-related and includes at least one of a control frame, a data frame, a sequence, a reference signal, a measurement result of a sequence, or a measurement result of a reference signal. The exchanging second information includes receiving the second information sent by the network device by using a plurality of types of beamforming in a selectable area of the network device, determining, based on the received second information, beamforming in which the network device has best sending performance, and sending second information related to the beamforming with best sending performance and/or an identifier of the beamforming with best sending performance to the network device; and/or the exchanging second information includes: sending, by the terminal device, the second information to a plurality of types of beamforming of the network device, and receiving second information related to sending and receiving beamforming and/or an identifier of sending and receiving beamforming that are/is sent by the network device after determining the sending and receiving beamforming based on the second information.

Optionally, the method further includes at least one of the following steps: when accessing the system, accessing, by the terminal device, the micro cell(s); after accessing the micro cell(s), camping, by the terminal device, on the micro cell(s) when there is no service; or when a new service needs to be processed after a service ends, interacting, by the terminal device, with the network device based on context information of the terminal device.

Optionally, the network device includes a macro base station, the macro base station provides a macro cell, and before the terminal device accesses the micro cell(s), the method further includes: camping, by the terminal device, on the macro cell when there is no service to trigger the terminal device; and when there is a service, receiving, by the terminal device, the configuration information that is of the micro cell(s) and that is sent by the macro base station.

Optionally, before the terminal device accesses the micro cell(s), the method further includes: receiving, by the terminal device, the configuration information that is of the micro cell(s) and that is sent by the network device, where the configuration information includes at least one of the following items: a configuration parameter of a common feature of micro cells covered by the network device, access information of a common feature of the micro cells, or access information of each of the micro cells.

Optionally, the configuration information is configuration information generated when the network device establishes the micro cell(s), or configuration information updated by the network device.

According to another aspect, this application provides a network device, applicable to a wireless communications system that provides a service for a terminal device, where the network device includes: a processing unit, configured to: configure micro cell(s) for the terminal device or a terminal device group in which the terminal device is located. The micro cell(s) provide a service for only the terminal device or the terminal device group. The quantity of the micro cell(s) is N, and N is a natural number greater than or equal to 1. The processing unit is further configured to maintain a connection between the and the terminal device based on configuration information of the micro cell(s) after the terminal device accesses the micro cell(s). The network device further includes a sending unit, configured to send the configuration information of the micro cell(s) to the terminal device or the terminal device group.

Optionally, that the processing unit is configured to configure micro cell(s) includes: obtaining information, and configuring the micro cell(s) based on the obtained information.

Optionally, that the processing unit is configured to configure the micro cell(s) based on the obtained information includes: determining receiving and sending sectors of the micro cell(s) based on the obtained information by means of sector scanning, where the sector scanning is implemented by using at least one of the following items: interaction that is between the network device and the terminal device or the terminal device group and that is of at least one piece of the following sector-related information: a control frame, a data frame, a sequence, a reference signal, a measurement result of a sequence, or a measurement result of a reference signal; and/or that the processing unit is configured to configure the micro cell(s) based on the obtained information includes: determining beamforming(s) of the micro cell(s) based on the obtained information by using a beam training process, and determining, in the beam training process, receiving and sending beamforming(s) of the micro cell(s) by using at least one of the following items: interaction that is between the network device and the terminal device or the terminal device group and that is of at least one piece of the following beamforming-related information: a control frame, a data frame, or a sequence; measurement results that are of a reference signal and/or a sequence related to beamforming and that are fed back by the terminal device or the terminal device group; or measurement results obtained after the network device measures a reference signal and/or a sequence related to beamforming.

Optionally, the processing unit is further configured to: perform configuration update on the micro cell(s) based on the obtained information, and keep a parameter used to trigger a handover procedure unchanged.

Optionally, that the processing unit performs configuration update on the micro cell(s) based on the obtained information includes: updating, by the processing unit, the receiving and sending sectors of the micro cell(s) based on the obtained information by means of sector scanning, where the sector scanning is implemented by using at least one of the following items: interaction that is between the terminal device or the terminal device group and the network device and that is of at least one piece of the following sector-related information: a control frame, a data frame, a sequence, a reference signal, a measurement result of a sequence, or a measurement result of a reference signal; and/or that the processing unit performs configuration update on the micro cell(s) based on the obtained information includes: updating, by the processing unit, the beamforming(s) of the micro cell(s) based on the obtained information by using a beam training process, and updating, in the beam training process, the receiving and sending beamforming(s) of the micro cell(s) by using at least one of the following items: interaction that is between the network device and the terminal device or the terminal device group and that is of at least one piece of the following beamforming-related information: a control frame, a data frame, or a sequence; measurement results that are of a reference signal and/or a sequence related to beamforming and that are fed back by the terminal device or the terminal device group; or measurement results obtained after the network device measures a reference signal and/or a sequence related to beamforming.

Optionally, that the processing unit is configured to obtain information includes: obtaining at least one of the following items: a current channel condition of the terminal device or the terminal device group, a current location of the terminal device or the terminal device group, channel condition change information of the terminal device or the terminal device group, or location change information of the terminal device or the terminal device group; and/or receiving information from the terminal device or the terminal device group by using a receiving unit of the network device; and/or receiving a reference signal from the terminal device or the terminal device group by using a receiving unit of the network device.

Optionally, the processing unit is further configured to: store context information of the terminal device by using a storage unit of the network device, after the terminal device has no service, continue to store the context by using the storage unit, and after determining that the terminal device has a service, use the context information stored by the storage unit to process the service for the terminal device. Optionally, the processing unit is further configured to: after determining that the terminal device has no service, enable the terminal device to camp on the micro cell(s). Optionally, the processing unit is further configured to: after determining that the terminal device has no service and camps on the micro cell(s), minimize transmit power(s) of the micro cell(s), and after determining that the terminal device has a service, restore the transmit power(s) of the micro cell(s).

Optionally, the network device is corresponding to a first micro device and a second micro device, micro cell(s) that can be provided by the first micro device is corresponding to a first coverage area, micro cell(s) that can be provided by the second micro device is corresponding to a second coverage area, and the network device configures the micro cell(s) for the terminal device by using the first micro device.

That the processing unit is configured to maintain connection(s) between the micro cell(s) and the terminal device based on configuration information of the micro cell(s) after the terminal device accesses the micro cell(s) includes: after the terminal device accesses the micro cell(s), and it is determined that the terminal device moves from the first coverage area to the second coverage area, or it is determined that the terminal device moves into the second coverage area, configuring the micro cell(s) corresponding to the second coverage area for the terminal device based on information about the terminal device and information about the micro cell(s), providing the micro cell(s) for the terminal device by using the second micro device, keeping the parameter used to trigger a handover procedure unchanged, and maintaining the connection(s) between the micro cell(s) and the terminal device based on the configuration information of the micro cell(s).

Optionally, the network device is a macro base station or a controller, and the first micro device and the second micro device are micro base stations or antenna clusters; or the network device is a micro base station or a controller, and the first micro device and the second micro device are antenna clusters.

Optionally, the network device is a macro base station, the macro base station provides a macro cell, and the terminal device camps on the macro cell when there is no service to trigger the terminal device; and the processing unit is further configured to: when the terminal device has a service, send the configuration information of the micro cell(s) to the terminal device by using the sending unit.

Optionally, the processing unit is further configured to: before the terminal device accesses the micro cell(s), send the configuration information of the micro cell(s) to the terminal device by using the sending unit, where the configuration information includes at least one of the following items: a configuration parameter of a common feature of micro cells covered by the network device, access information of a common feature of the micro cells, or access information of each of the micro cells.

According to another aspect, this application provides a wireless communications system, configured to provide a service for a terminal device. The system includes a first network device and a second network device. The first network device is corresponding to a first micro device, micro cell(s) that can be provided by the first micro device is corresponding to a first coverage area. The second network device is corresponding to a second micro device, and micro cell(s) that can be provided by the second micro device is corresponding to a second coverage area. The first network device is configured to: configure, by using the first micro device, the micro cell(s) for the terminal device or a terminal device group in which the terminal device is located, where the micro cell(s) provide a service for only the terminal device or the terminal device group. The quantity of micro cell(s) is N, and N is a natural number greater than or equal to 1; and after the terminal device accesses the micro cell(s), and the first network device determines that the terminal device moves from the first coverage area to the second coverage area. The first network device is further configured to send information about the terminal device and information about the micro cell(s) to the second network device. The second network device is configured to: configure the micro cell(s) for the terminal device based on the information about the terminal device and the information about the micro cell(s), provide the micro cell(s) for the terminal device by using the second micro device, keep a parameter used to trigger a handover procedure unchanged, and maintain connection(s) between the micro cell(s) and the terminal device based on configuration information of the micro cell(s). Alternatively or additionally, the first network device is configured to: configure the micro cell(s) for the terminal device in the first coverage area or a terminal device group in which the terminal device is located; provide the micro cell(s) for the terminal device by using the first micro device. The micro cell(s) provide a service for only the terminal device or the terminal device group; and send information about the terminal device and information about the micro cell(s) to the second network device based on a request of the second network device. The second network device is configured to: after the terminal device accesses the micro cell(s). The second network device determines that the terminal device moves into the second coverage area, send a request to the first network device based on information received from the terminal device, and obtain the information about the terminal device and the information about the micro cell(s) from the first network device. The second network device is configured to configure the micro cell(s) for the terminal device based on the information about the terminal device and the information about the micro cell(s), provide the micro cell(s) for the terminal device by using the second micro device, keep a parameter used to trigger a handover procedure unchanged, and maintain connection(s) between the micro cell(s) and the terminal device based on configuration information of the micro cell(s).

Optionally, that the second network device is configured to: configure the micro cell(s) for the terminal device based on the information about the terminal device and the information about the micro cell(s), provide the micro cell(s) for the terminal device by using the second micro device, and keep a parameter used to trigger a handover procedure unchanged includes: the second network device, configured to: before the terminal device enters the coverage area of the second micro device, configure, for the terminal device based on the information about the terminal device and the information about the micro cell(s), micro cell(s) that can ensure service continuity of the terminal device, provide the micro cell(s) for the terminal device by using the second micro device, and keep the parameter used to trigger a handover procedure unchanged; and after the terminal device enters the coverage area of the second micro device, perform configuration update on the micro cell(s) based on a measurement result reported by the terminal device or a result obtained after the second micro device measures a signal of the terminal device, and keep the parameter used to trigger a handover procedure unchanged.

Optionally, the first network device and the second network device are macro base stations or controllers, and the first micro device and the second micro device are micro base stations or antenna clusters; or the first network device and the second network device are micro base stations or controllers, and the first micro device and the second micro device are antenna clusters.

According to another aspect, this application further provides a terminal device, where a wireless communications system provides a service for the terminal device, and the terminal device includes a receiving unit, a processing unit, and a sending unit configured to send information. The receiving unit is configured to receive configuration information that is of micro cell(s) and that is sent by a network device. The micro cell(s) are micro cell(s) configured for the terminal device or a terminal device group in which the terminal device is located, and the micro cell(s) provide a service for only the terminal device or the terminal device group. The processing unit is configured to: access the micro cell(s) based on the configuration information received by the receiving unit, and maintain a connection between the terminal device and the micro cell(s) based on the configuration information of the micro cell(s).

Optionally, the receiving unit is further configured to receive first information sent by the network device by using a plurality of sectors in a selectable area of the network device, where the first information is sector-related and includes at least one of a control frame, a data frame, a sequence, a reference signal, a measurement result of a sequence, or a measurement result of a reference signal; and the processing unit is further configured to: determine, based on the received first information, a sector in which the network device has best sending performance, and send, by using the sending unit, first information related to the sector with best sending performance and/or an identifier of the sector with best sending performance to the network device.

Optionally, the processing unit is further configured to control the sending unit to send first information to a plurality of sectors of the network device by using a plurality of sectors in a selectable area of the terminal device or by using a sector in which the network device has best sending performance, where the first information is sector-related and includes at least one of a control frame, a data frame, a sequence, a reference signal, a measurement result of a sequence, or a measurement result of a reference signal. The receiving unit is further configured to receive first information related to a receiving sector of the network device and/or an identifier of a receiving sector of the network device that are/is sent by the network device after determining the receiving sector based on the first information.

Optionally, the receiving unit is further configured to receive second information sent by the network device by using a plurality of types of beamforming in a selectable area of the network device, where the second information is beamforming-related and includes at least one of a control frame, a data frame, a sequence, a reference signal, a measurement result of a sequence, or a measurement result of a reference signal. The processing unit is further configured to: determine, based on the second information received by the receiving unit, beamforming in which the network device has best sending performance, and send, by using the sending unit of the terminal device, second information related to the beamforming with best sending performance and/or an identifier of the beamforming with best sending performance to the network device.

Optionally, the sending unit is further configured to send second information to a plurality of types of beamforming of the network device, where the second information is beamforming-related and includes at least one of a control frame, a data frame, a sequence, a reference signal, a measurement result of a sequence, or a measurement result of a reference signal. The receiving unit is further configured to receive second information related to sending and receiving beamforming and/or an identifier of sending and receiving beamforming that are/is sent by the network device after determining the sending and receiving beamforming based on the second information.

Optionally, the network device includes a macro base station, the macro base station provides a macro cell. The processing unit is further configured to: camp on the macro cell when there is no service to trigger the terminal device, and when there is a service, receive, by using the receiving unit, the configuration information that is of the micro cell(s) and that is sent by the macro base station.

Optionally, the processing unit is configured to: before the terminal device accesses the micro cell(s), receive the configuration information, where the configuration information includes at least one of the following items: a configuration parameter of a common feature of micro cells covered by the network device, access information of a common feature of the micro cells, or access information of each of the micro cells.

Optionally, the configuration information is configuration information generated when the network device establishes the micro cell(s), or configuration information updated by the network device.

In the foregoing embodiments, optionally, the information obtained by the network device includes at least one of the following items: a current channel condition of the terminal device or the terminal device group, a current location of the terminal device or the terminal device group, channel condition change information of the terminal device or the terminal device group, location change information of the terminal device or the terminal device group, information received from the terminal device or the terminal device group, or a reference signal received from the terminal device or the terminal device group.

Optionally, the network device may receive information from the terminal device or the terminal device group, and the information may include at least one of the following items: a sequence, a measurement result of a sequence, a measurement result of a reference signal, a control frame, data, an ID of the terminal device or the terminal device group, dedicated code of the terminal device or the terminal device group, an index number corresponding to dedicated code of the terminal device or the terminal device group, cell code that is bound to the terminal device or the terminal device group, an index number of cell code that is bound to the terminal device or the terminal device group, or ID(s) of the micro cell(s), where the ID(s) of the micro cell(s) are corresponding to the terminal device or the terminal device group.

Optionally, after configuration update is performed on the micro cell(s), the method may further include: sending, by the network device, updated configuration information of the micro cell(s) to the terminal device or the terminal device group by using at least one of radio resource control RRC layer signaling, media access control MAC layer signaling, or physical layer control signaling.

Optionally, the access information of the common feature of the micro cells includes at least one of the following items: capability information of the common feature of the micro cells, information about a service that can be provided, a PLMN ID, TA code, carrier/frequency information, working mode information, cell logical channel configuration information, cell physical channel and signaling configuration information, or timer information; and/the access information of each of the micro cells includes at least one of the following items: capability information of each of the micro cells, information about a service that can be provided, a PLMN ID, TA code, carrier/frequency information, working mode information, cell logical channel configuration information, cell physical channel and signaling configuration information, or timer information.

Optionally, the configuration information of the micro cell(s) includes at least one of an identifier, access information, physical layer configuration information, higher layer configuration information, or measurement information of the micro cell(s). The identifier(s) of the micro cell(s) includes at least one of a sequence used to identify the micro cell(s), an index number corresponding to a sequence used to identify the micro cell(s), ID(s) of antenna beam(s) that form the micro cell(s), a network device number, offset, or a dedicated ID of the terminal device or the terminal device group. The physical layer configuration information of the micro cell(s) includes at least one piece of the following information: at least one reference signal or sequence of each micro cell(s), where the at least one reference signal or sequence can be used for at least one of cell synchronization, channel demodulation, channel evaluation, or radio resource management RRM measurement, at least one physical channel, antenna information, a scrambling sequence index SCID, precoding information, channel matrix information, codebook information, layer information, a quantity of antenna ports, an antenna port number, beam optimization capability information, a valid time, valid duration, a control channel, a CP length, or power control information.

Optionally, the control channel in the physical layer configuration information uses an enhanced control channel, and the enhanced control channel can implement a beamforming function and carry common and/or dedicated control information of the micro cell(s).

Optionally, in the foregoing apparatus embodiments, the processing unit may be a processor, the sending unit may be a transmitter, the receiving unit may be a receiver, and the storage unit may be a memory.

In the solutions provided in the embodiments of the present invention, the micro cell(s) that provide a service for only the terminal device is allocated to the terminal device, and the connection(s) between the micro cell(s) and the terminal device is maintained based on the configuration information of the micro cell(s) after the terminal device accesses the micro cell(s). Therefore, unlike the prior art, it is ensured that frequent inter-cell handover for a reason such as movement of the terminal device is not required after the terminal device accesses the micro cell(s), service continuity is ensured, and a large amount of measurement and handover signaling is reduced. Because frequent inter-cell handover is not required, an inter-cell handover procedure failure for a reason such as a radio link failure is avoided.

In addition, because the micro cell(s) provide a service for only the terminal device, a prior-art problem that interference between terminal devices exists when there are a large quantity of terminal devices in one cell is avoided. In addition, because one cell has only one terminal device, inter-cell interference caused by the terminal device is greatly reduced, so that complexity of an inter-cell interference coordination (ICIC) technology can be reduced, and a gain brought by the ICIC technology is increased.

DETAILED DESCRIPTION OF ILLUSTRATIVE EMBODIMENTS

Figure 1:
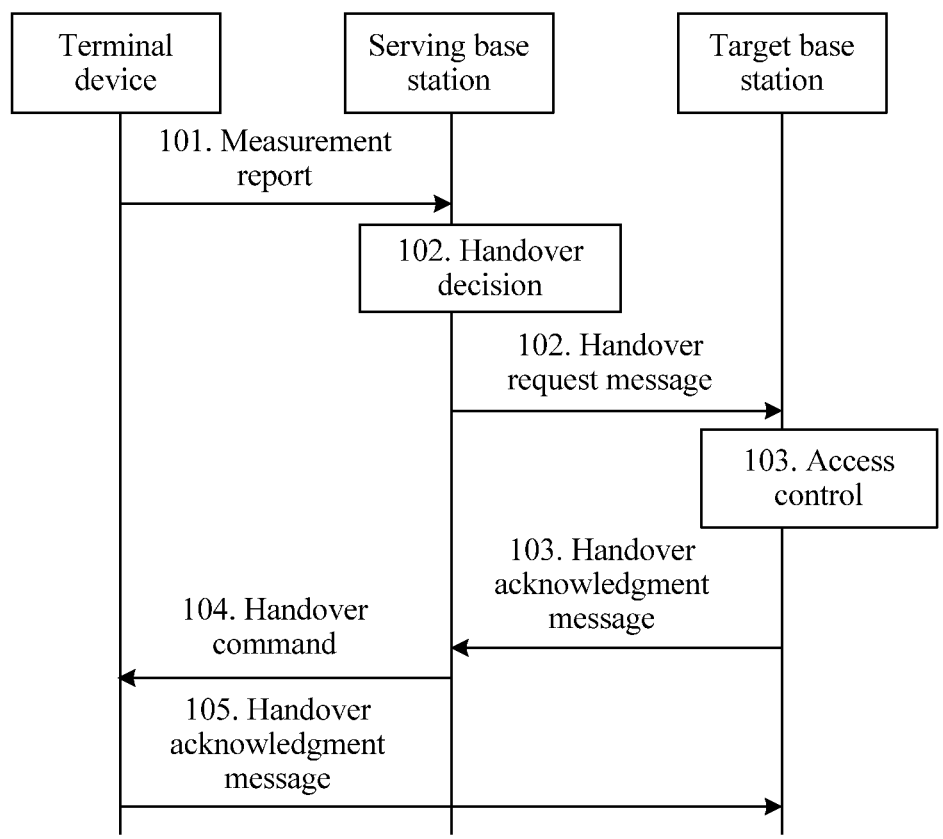
FIG. 1 is a schematic diagram of a handover procedure in the prior art.

The following describes the embodiments of the present invention in detail with reference to accompanying drawings.

In a current handover solution, a main reason that handover needs to be performed between a serving cell and a target cell is as follows. Due to fixed geographical coverage areas of the serving cell and the target cell, if a terminal device moves from the geographical coverage area of the serving cell to the geographical coverage area of the target cell, because the serving cell and the target cell have different cell configuration such as cell access information including cell ID information and the like, configuration information including cell logical channel configuration information, cell physical channel and signaling configuration information, and the like, and some other information, and the terminal device needs to interact with a cell by using cell configuration, the terminal device needs to be handed over to the target cell and obtain cell configuration of the target cell, and interacts with the target cell based on information such as an ID and the cell configuration of the target cell. In addition, some information, such as an ID and radio access information of the terminal device, and radio resource management (RRM) information, security information (such as a security algorithm and a security key), and measurement information of the UE, that the terminal device exchanges with the serving cell needs to be sent to the target cell, so that the target cell interacts with the terminal device based on the information after handover.

Therefore, the embodiments of the present invention provide an implementation solution. A micro cell that provides a service for only UE is configured for the UE, so that the micro cell provides a service for only the UE after the UE accesses a system by using the micro cell; and a network device maintains a connection between the micro cell and the UE based on configuration information of the micro cell. That is, after the UE accesses the micro cell, unlike the prior art, the UE does not need to be frequently handed over between cells for a reason such as movement of the UE. For example, in an area supported by the network device, the UE does not need to be handed over between cells. If there are a plurality of network devices, the UE may not be handed over between cells in areas supported by the network devices. Certainly, in the embodiments of the present invention, a scenario in which the UE is handed over between cells when the UE moves from an area supported by a network device to an area supported by another network device is not excluded. A scenario in which the UE does not need to be handed over between cells after the UE accesses the micro cell is not excluded either.

Before the embodiments of the present invention are described in detail, a wireless communications system that may be used in the embodiments of the present invention is first described with reference to the accompanying drawings.

Although description is given in the foregoing background by using an LTE system as an example, a person skilled in the art should understand that the embodiments of the present invention are not only applicable to the LTE system, but also applicable to another wireless communications system such as a GSM system, a UMTS system, a CDMA system, or a new network system. The embodiments of the present invention are applicable to a system that supports a distributed cell. For example, the embodiments of the present invention may be applied to an evolved communications system that supports distributed multiple-input multiple-output (MIMO), or may be applied to a communications system that supports distributed coordinated multipoint transmission (COMP). The MIMO technology or the COMP technology may be set in a wireless access system using LTE, a Universal Mobile Telecommunications System (UMTS), or another standard.

The following mainly describes specific embodiments by using the LTE system as an example.

The terminal device in the embodiments of the present invention may be user equipment (UE), or may be a handheld terminal, or may be a communications node on a household appliance, a medical device, an industrial device, an agricultural device, an aeronautical device, or the like, or may be a device similar to a communications node used for D2D communication or the like. The D2D communication may be point-to-point communication, point-to-multipoint group communication, public safety communication, and the like. For ease of description, the UE is used as an example in the embodiments of the present invention. The network device in the embodiments of the present invention may be a macro base station, a micro base station, a controller, a relay node, a mobility management entity (MME), a communications node used for D2D communication, or another similar network device. The network device may be included in the foregoing various wireless communications systems, and the wireless communications systems may further include the UE.

Figure 2:
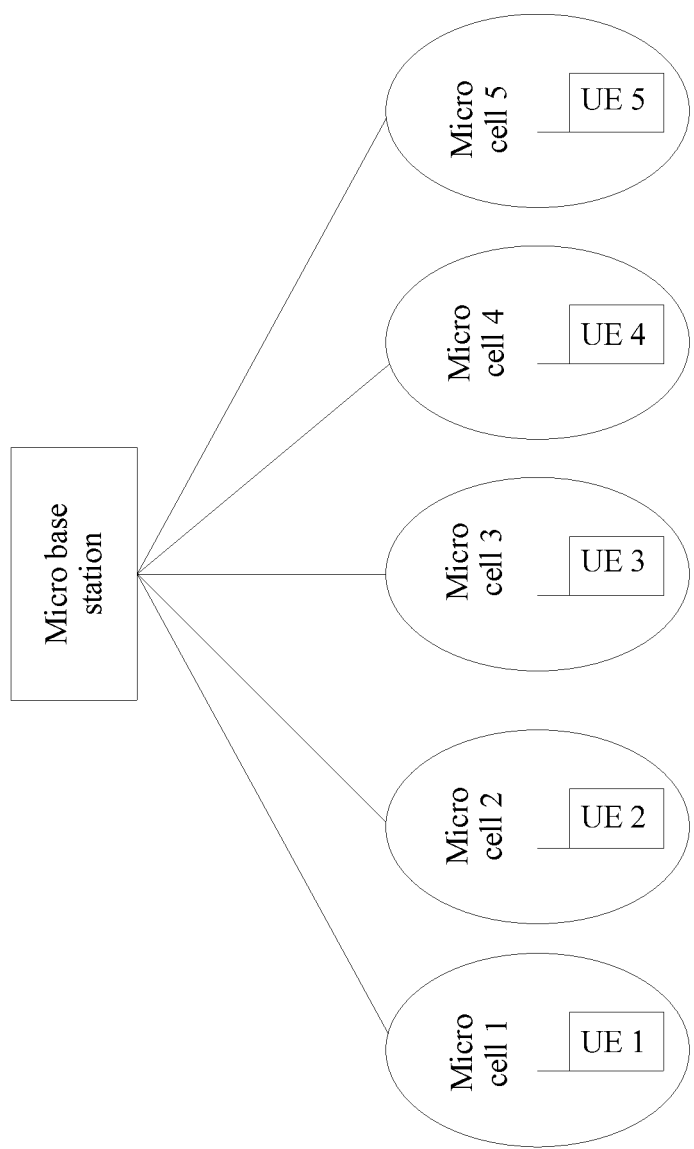
FIG. 2 is a schematic structural diagram of a wireless communications system according to an embodiment of the present invention.

Because the wireless communications system in the embodiments of the present invention needs to provide a micro cell for the UE, a micro device that can provide a micro cell is required. The micro device may be a micro base station, or may be an antenna cluster. Because the system further needs to configure a micro cell for the UE, a network device that can configure a micro cell is further required. As shown in FIG. 2, if a micro base station has a configuration function, the network device may be directly the micro base station.

Figure 3:
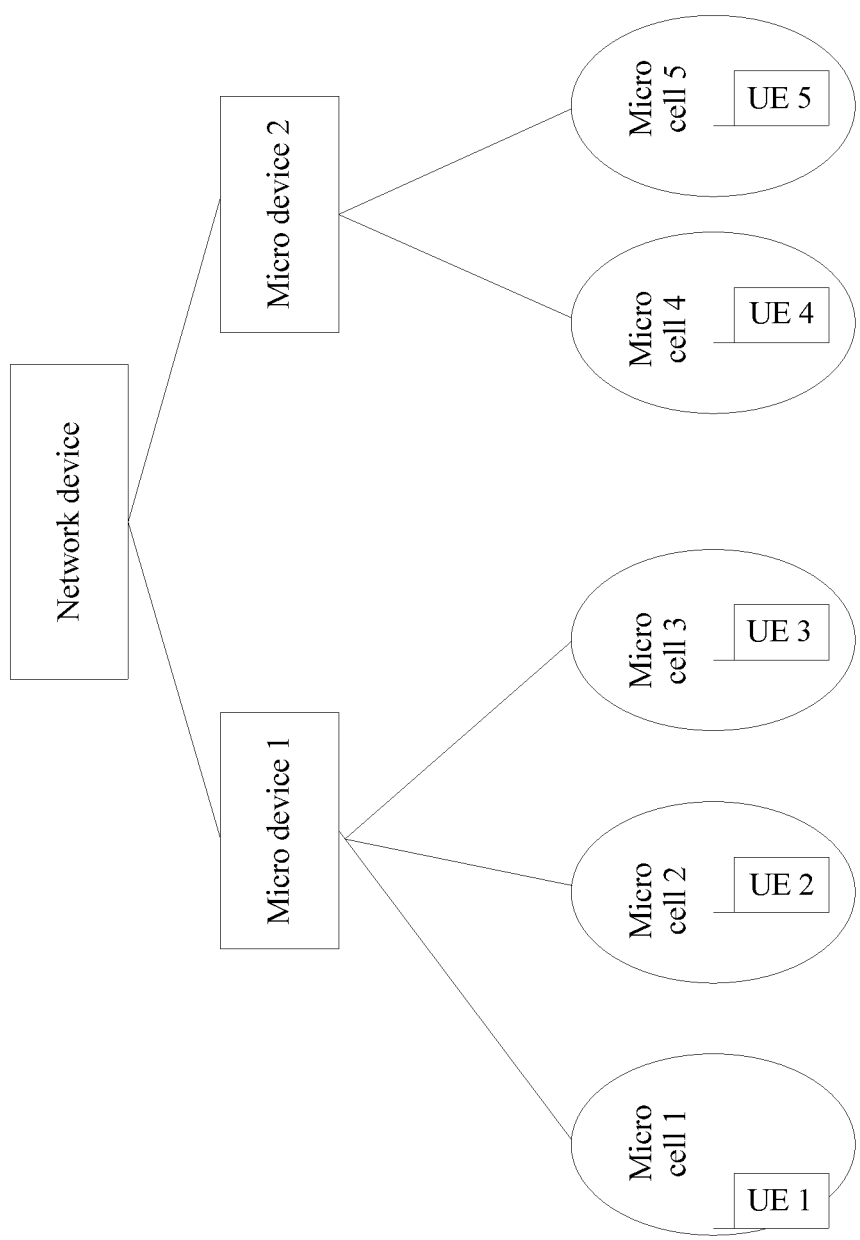
FIG. 3 is a schematic structural diagram of another wireless communications system according to an embodiment of the present invention.

As shown in FIG. 3, generally, the micro base station can provide a relatively limited quantity of functions, and the antenna cluster even has no control function. Therefore, the micro device needs to be controlled by the network device. The network device may be an independently disposed controller, or may be an existing macro base station in a network. Certainly, the controller may be independently disposed, or may be collaboratively disposed with another device, for example, may be disposed in a macro base station, or may be disposed in a micro base station. If a macro base station exists, the macro base station and the micro device may be co-sited, for example, a plurality of micro devices whose geographical locations are distributedly arranged are added to a site of the macro base station. The macro base station and the micro device may be connected by using a microwave, a free space laser, an optical fiber, or another low and medium speed line. In addition, if the micro device is a micro base station, the macro base station may share a baseband system with these micro base stations, so that channel information and data information can be shared between the macro base station and the micro base station.

There may be an extremely large quantity of micro base stations or an extremely large quantity of antenna clusters in the system architecture, for example, hundreds or even thousands of micro base stations or antenna clusters may be disposed. In the system architecture, a micro cell may be a cell formed by beamforming provided by one or more micro base stations. Certainly, a micro cell may be a cell formed by beamforming provided by one or more antenna clusters. The micro cell may provide only one type of beamforming for the UE, or may provide a plurality of types of beamforming, and may specifically serve the UE in at least one of the following manners: macro diversity, micro diversity, a joint codebook, MBSFN-manner-based sending, a time division service, joint sending, or joint reception.

Figure 4:
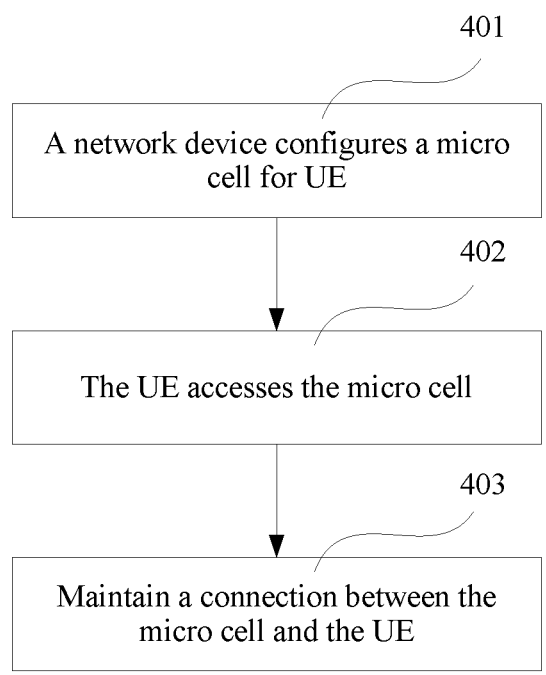
FIG. 4 is a schematic flowchart according to an embodiment of the present invention.

As shown in FIG. 4, an embodiment of the present invention includes the following steps:

Step 401: A network device configures a micro cell for UE, where the micro cell provides a service for only the UE.

A quantity of configured micro cells is N, and N is a natural number greater than or equal to 1. That is, the network device may configure only one micro cell, or may configure a plurality of micro cells for the UE, and these micro cells jointly provide a service for the UE. The similar can be said for the following embodiments of this application, and details are not especially repeatedly described.

Step 402: The UE accesses the micro cell based on configuration information of the micro cell.

The configuration information may include at least one of an identifier, access information, physical layer configuration information, higher layer configuration information, or measurement information of the micro cell.

Step 403: The network device maintains a connection between the micro cell and the UE based on the configuration information of the micro cell after the UE accesses the micro cell.

Further, after step 403, if a service of the UE ends, the network device may release a resource of the micro cell.

In the embodiment shown in FIG. 4, the network device allocates, to the UE, the micro cell that provides a service for only the UE, and the network device maintains the connection between the micro cell and the UE based on the configuration information of the micro cell after the UE accesses the micro cell. Therefore, unlike the prior art, it is ensured that after the UE accesses the micro cell, the micro cell can provide a service for the UE and frequent inter-cell handover for a reason that the UE moves out of an original cell coverage area is not required, service continuity is ensured, and a large amount of measurement and handover signaling is reduced. Because frequent inter-cell handover is not required, an inter-cell handover procedure failure for a reason such as a radio link failure is avoided. For example, in an area supported by the network device, the UE does not need to be handed over between cells. If there are a plurality of network devices, the UE may not be handed over between cells in areas supported by the network devices.

In addition, because the micro cell provides a service for only the UE, a prior-art problem that inter-UE interference exists when there are a large quantity of UEs in one cell is avoided. In addition, because one cell has only one UE, inter-cell interference caused by the UE is greatly reduced, so that complexity of an inter-cell interference coordination (ICIC) technology can be reduced, and a gain brought by the ICIC technology is increased.

As described above, the configuration information may include at least one of an identifier, access information, physical layer configuration information, higher layer configuration information, or measurement information of the micro cell. The UE may successfully demodulate data and/or control information from the cell based on the configuration information. For example, the UE may determine antenna port information, layer information, scrambling information, and the like based on the configuration information, to obtain a specific resource location of a reference signal in the cell. Then, the UE measures the reference signal to obtain H*W, that is, a channel matrix*a codebook, where the codebook is also referred to as a weight vector, or to obtain H, and therefore can demodulate the data and/or control information from the micro cell.

The identifier of the micro cell may include at least one of a sequence used to identify the micro cell, an index number corresponding to a sequence used to identify the micro cell, an ID of an antenna beam that forms the micro cell, a network device number, offset, or a dedicated ID of the terminal device. The network device number may be a number of a network device to which the micro cell belongs. The network device may be a micro base station, or may be a macro base station, or may be an independent controller.

The physical layer configuration information of the micro cell includes at least one piece of the following information: at least one reference signal or sequence of the micro cell, where the at least one reference signal or sequence can be used for at least one of cell synchronization, channel demodulation, channel evaluation, or radio resource management (RRM) measurement, at least one physical channel, antenna information, a scrambling sequence index (SCID), precoding information, channel matrix information, codebook information, layer information, a quantity of antenna ports, an antenna port number, beam optimization capability information, a valid time, valid duration, a control channel, a cyclic prefix (CP) length, or power control information.

The control channel in the physical layer configuration information uses an enhanced control channel, and the enhanced control channel can implement a beamforming function and carry common and/or dedicated control information of the micro cell. Optionally, the control channel in the physical layer configuration information uses a reference signal dedicated to the UE.

In the embodiment shown in FIG. 4, step 401 that a network device configures a micro cell for UE may be specifically as follows: The network device configures the micro cell based on obtained information, and sends the configuration information of the micro cell to the UE. The network device may specifically send the configuration information to the UE by using at least one of RRC, MAC, or physical layer control signaling. The information obtained by the network device may be at least one of the following items: a current channel condition of the UE, a current location of the UE, channel condition change information of the UE, location change information of the UE, information received from the UE, or a reference signal received from the UE.

If the information obtained by the network device is the information received from the UE, the information received from the UE may be specifically at least one of the following items: a sequence, a measurement result of a sequence, a measurement result of a reference signal, a control frame, data, an ID of the UE, dedicated code of the UE, an index number corresponding to dedicated code of the UE, cell code that is bound to the UE, an index number of cell code that is bound to the UE, or an ID of the micro cell, where the ID of the micro cell is corresponding to the UE, and the correspondence includes a one-to-one correspondence or a many-to-one correspondence, that is, the ID of the micro cell may be in a one-to-one correspondence with the UE, or IDs of a plurality of micro cells may be corresponding to the UE. The data may include a data frame, or may be service data and the like. The information may be unique in an entire network, or may be unique in a local area, for example, the information is unique in an area of the micro cell that can be provided by the network device, or is unique in a local area.

The ID of the micro cell may be a micro cell ID allocated by the network device to the UE based on the received sequence or dedicated code of the UE or the ID of the UE in a process in which the UE accesses the network device.

Alternatively, the ID of the micro cell is a micro cell ID that is sent by the UE to the network device and stored by the UE in a process in which the UE accesses the network device. The micro cell ID stored by the UE may be previously allocated by the network device or another network device to the UE, or may be a preconfigured micro cell ID that is stored in the UE.

In this embodiment of the present invention, the network device may configure only one micro cell for the UE, or may configure a plurality of micro cells for the UE. The plurality of micro cells may have a same ID or different IDs. When the plurality of micro cells have a same ID, the plurality of micro cells may be distinguished by using another identifier, for example, different micro cells have different reference signal configuration, different micro cells have different synchronization channel configuration, or different micro cells have different antenna information. Different micro cells may provide a service for the UE by using a CA (carrier aggregation) technology, a CoMP (coordinated multipoint transmission) technology, or an LAA-LTE (licensed-assisted access using LTE) technology.

In this embodiment of the present invention, that the network device configures the micro cell based on obtained information may specifically include at least one of the following steps: determining receiving and sending sectors of the micro cell based on the obtained information, or determining receiving and sending beamforming of the micro cell based on the obtained information by using a beam training process. If the receiving and sending sectors and/or the receiving and sending beamforming of the micro cell are determined, a coverage area of the micro cell may be determined. Certainly, only the receiving sector or only the sending sector may be determined based on a requirement. The similar can be said for beamforming.

The network device may specifically determine the receiving and sending sectors of the micro cell based on the obtained information by means of sector scanning. Correspondingly, the UE also determines corresponding receiving and sending sectors by interacting with the network device. The receiving sector of the network device is the sending sector of the UE, and the sending sector of the network device is the receiving sector of the UE.

Specifically, the sector scanning may be implemented in at least one of the following manners: interaction that is between the UE and the network device and that is of a control frame and/or a data frame related to a sector, interaction that is between the UE and the network device and that is of a sequence related to a sector, interaction that is between the UE and the network device and that is of a reference signal and/or a measurement result of a reference signal related to a sector, or interaction that is between the UE and the network device and that is of a sequence and/or a measurement result of a sequence related to a sector.

A manner of determining the sending sector by means of exchange of a control frame and/or a data frame related to a sector may be as follows: The network device sends, to the UE by using each sector in a selectable area of the network device, a control frame and/or a data frame corresponding to each sector. The UE evaluates the received control frames and/or data frames corresponding to the sectors, determines a sector in which the network device has best sending performance, and sends a control frame and/or a data frame related to the sector with best sending performance to the network device. The network device uses the sector to which the received control frame and/or data frame are/is related as the sending sector of the network device. Herein, the UE may receive, by using an omnidirectional antenna, the control frames and/or the data frames corresponding to the sectors. Therefore, the UE does not need to determine the receiving sector of the UE. Certainly, the UE may use the determined sector in which the network device has best sending performance as the receiving sector of the UE. Optionally, the network device may send a control frame and/or a data frame to each sector in a selectable area of the UE.

It should be noted that when determining a sector, the network device sends a control frame and/or a data frame by using each sector in the selectable area of the network device, or may send a control frame and/or a data frame to each sector in the selectable area of the UE. Actually, sending may be performed in some sectors instead of each sector in the selectable area. The similar can be said for a sector determining manner and a beamforming determining manner that are described in the following, and details are not repeatedly described.

A manner of determining the receiving sector of the network device by means of exchange of a control frame and/or a data frame may be as follows: The UE may send, to some or all sectors of the network device by using each sector in a selectable area of the UE, a control frame and/or a data frame corresponding to each sector; or send, to some or all sectors of the network device by using a previously determined sending sector in which the network device has best sending performance, a control frame and/or a data frame corresponding to the sending sector in which the network device has best sending performance. The network device evaluates the received control frames and/or data frames corresponding to the sectors, and determines a sector in which the network device has best receiving performance as the receiving sector of the network device. The network device may further send, to the UE, a control frame and/or a data frame related to the receiving sector and/or an identifier of the receiving sector. The UE may determine the sending sector of the UE based on the received control frame and/or data frame, and/or the received identifier of the receiving sector.

For a manner of determining the sending and receiving sectors by means of interaction that is between the UE and the network device and that is of a sequence related to a sector, a specific implementation solution is similar to the foregoing solutions of determining a sector by using a control frame and/or a data frame, and details are not further described.

A manner of determining the sending sector of the network device by means of interaction that is between the UE and the network device and that is of a measurement result of a reference signal related to a sector may be as follows: The network device sends, to the UE by using each sector in a selectable area of the network device, a reference signal dedicated to each sector. The UE measures the received reference signals corresponding to the sectors, determines a sector in which the network device has best sending performance, and sends an identifier of the sector with best sending performance and/or a measurement result to the network device. The network device determines the sending sector of the network device based on the identifier of the sector with best sending performance and/or the measurement result. Similar to the foregoing solution of determining the sending sector of the network device, the UE may receive a signal by using an omnidirectional antenna, or may use the sector in which the network device has best sending performance as the receiving sector of the UE.

A manner of determining the receiving sector of the network device by means of interaction that is between the UE and the network device and that is of a measurement result of a reference signal related to a sector may be as follows: The UE sends, to some or all sectors of the network device by using each sector in a selectable area of the UE or by using a previously determined sector in which the network device has best sending performance, a reference signal corresponding to each sector on a UE side. The network device measures the received reference signals corresponding to the sectors, and determines a sector in which the network device has best receiving performance as the receiving sector of the network device. The network device may further send an identifier of the receiving sector and/or a measurement result to the UE. The UE may determine the sending sector of the UE based on the received information.

For a manner of determining the sending and receiving sectors by means of interaction that is between the UE and the network device and that is of a measurement result of a sequence related to a sector, a specific implementation solution is similar to the foregoing solutions of determining a sector by using a measurement result of a reference signal related to a sector, and details are not further described.

The network device may determine beamforming of the micro cell based on the obtained information by using a beam training process, and the network device determines, in the beam training process, the receiving and sending beamforming of the micro cell by using at least one of the following items: interaction that is between the UE and the network device and that is of a control frame and/or a data frame related to beamforming, interaction that is between the UE and the network device and that is of a sequence related to beamforming, a measurement result that is of a reference signal related to beamforming and that is fed back by the UE, a measurement result that is of a sequence related to beamforming and that is fed back by the UE, a measurement result obtained after the network device measures a reference signal related to beamforming, or a measurement result obtained after the network device measures a sequence related to beamforming.

A manner of determining the sending and receiving beamforming by using a control frame and/or a data frame sent by the UE may be as follows: The network device sends, to the UE by using each type of beamforming in a selectable area of the network device, a control frame and/or a data frame dedicated to each type of beamforming. The UE evaluates the received control frames and/or data frames corresponding to the types of beamforming, determines beamforming in which the network device has best sending performance, and sends a control frame and/or a data frame related to the beamforming with best sending performance to the network device. The network device uses beamforming corresponding to the received control frame and/or data frame as the sending and receiving beamforming of the network device. Correspondingly, the UE may use the beamforming with best sending performance as sending and receiving beamforming of the UE.

For a manner of determining the sending and receiving beamforming by using a sequence sent by the UE, or a measurement result of a reference signal, a measurement result of a sequence, or the like that is fed back by the UE, a specific implementation solution is similar to the solution of determining beamforming by using a control frame and/or a data frame. A difference is mainly as follows: In another manner, the UE may feed back a sequence related to beamforming with best sending performance, a measurement result of a reference signal related to beamforming with best sending performance, or a measurement result of a sequence related to beamforming with best sending performance. Therefore, details are not further described.

A manner of determining the sending and receiving beamforming by using a measurement result obtained after the network device measures a reference signal related to beamforming is as follows: The network device receives a reference signal that is sent by the UE by using each type of beamforming in a selectable area and that is dedicated to each type of beamforming, measures the received dedicated reference signals, determines beamforming with best sending performance, and uses the beamforming as the sending and receiving beamforming. The network device may further send, to the UE, an identifier of the beamforming and/or a measurement result of a reference signal related to beamforming. The UE may determine the sending and receiving beamforming based on the received information.

For a manner of determining the sending and receiving beamforming by using a measurement result obtained after the network device measures a sequence related to beamforming, a solution is similar to the foregoing solution of determining beamforming by using a measurement result of a reference signal, and details are not further described.

After the network device configures the micro cell, the configuration information of the micro cell usually changes for a reason such as a channel condition change of the micro cell and movement of UE. Therefore, the network device may further perform configuration update on the micro cell based on the obtained information, so that the micro cell more satisfies a current situation, and better provides a service for the UE.

The network device may perform configuration update on the micro cell based on the obtained information, for example, update the coverage area of the micro cell, update transmit power of the micro cell, and/or update at least one of a direction, a location, a width, or a weight vector of the beamforming, and send updated configuration information of the micro cell to the UE when there is a need. In addition, the network device keeps a parameter used to trigger a handover procedure unchanged. The parameter used to trigger a handover procedure includes at least one of the following items: a cell ID or a security context such as a security algorithm, a security key, or a security counter.

The network device may adjust the coverage area of the micro cell based on movement of the UE and the like, and does not change the parameter used to trigger an inter-cell handover procedure. Therefore, the micro cell that provides a service for the UE is adjusted based on a current situation, and inter-cell handover is not triggered, so that frequent inter-cell handover in the prior art is avoided.

Similar to the foregoing process of configuring the micro cell based on the obtained information, that the network device performs configuration update on the micro cell based on the obtained information may include: updating the receiving and sending sectors of the micro cell, and/or updating the receiving and sending beamforming of the micro cell by using a beam training process. Specific implementation of determining or updating a sector and determining or updating beamforming is similar to that in the foregoing micro cell configuration process, and details are not described herein.

As described above, after step 403, if a service of the UE ends, the network device may release the resource of the micro cell. In this case, the UE usually switches from an active state, in which the UE keeps continuously listening to network side signaling and/or data, to an idle state or a dormant state. The dormant state may be a discontinuous reception (DRX) sleep mode.

If there is a downlink service after the resource of the micro cell of the UE is released, the network device may send a wakeup command to the UE, and configure the micro cell for the UE. Correspondingly, the UE ends the DRX state and accesses the configured micro cell. A specific configuration manner is described above, and details are not described again.

Alternatively, after the UE enters the idle state or an inactive state, the UE may perform cell selection/reselection by interacting with the network device, to find a target cell and camp on the cell, where the target cell may be specifically a new cell; or may return to a macro cell before accessing the micro cell. Alternatively, the UE directly chooses to enter a macro cell before accessing the micro cell. If the UE cannot enter the macro cell, the UE performs cell selection/reselection by interacting with the network device and enters the DRX sleep mode.

In addition to the foregoing processing manners, this embodiment of the present invention further provides the following several implementations, to quickly provide a service for the UE.

In a manner, after the UE accesses the micro cell, and the UE has no service and enters an inactive state such as the idle or the DRX state, the network device still stores context information of the UE, but the UE does not need to continuously listen to signaling/data sent by the network device. In addition, after determining that the UE subsequently needs to transmit a service, the network device directly uses the context information to process the service for the UE. The context information may include the ID of the UE, configuration information of each protocol layer, radio frequency information, capability information of the UE, service information and security information of the UE, and the like.

In another manner, after the UE accesses the micro cell and it is determined that there is no service, the UE always camps on the micro cell. Even if the UE has accessed a macro cell before accessing the micro cell, the UE does not return to the macro cell, and even does not access another macro cell. In this embodiment, the UE camping on the micro cell is not necessarily in the idle state, and may be in a connected mode, the active state, or the like. Optionally, to reduce inter-cell interference, the transmit power of the micro cell is minimized, so that energy consumption of the network device and the UE is reduced, and interference to another UE and network device is reduced. In addition, after the UE has a service, the transmit power of the micro cell is restored. Optionally, a width of a beam may be minimized, and the UE is still in the connected mode and maintains an intermittent connection to the micro cell. Certainly, the two manners may be used by means of combination.

In the system shown in FIG. 3, if a macro base station exists in the system, the UE may camp on a macro cell before accessing the micro cell, and access the micro cell only when the UE has a service. Specifically, when there is no service to trigger the UE, the UE camps on the macro cell. In this case, the UE may be in the idle state. When there is a service to trigger the UE, the UE enters a connected mode, and correspondingly, the macro base station configures the micro cell for the UE. Specific configuration is described above, and details are not described again.

Certainly, the foregoing two processing manners of storing the context information and changing the transmit power may be used by means of combination, so that a service can be quickly provided for the UE, and inter-cell interference can be reduced as much as possible.

In step 403, the network device maintains the connection between the micro cell and the UE based on the configuration information of the micro cell. The connection is a connection existing when the UE is stationary, and may further be a connection between the UE and the micro cell during movement of the UE, or may be a connection between the UE and the micro cell during configuration update of the micro cell. Specifically, there are a plurality of cases.

For example, in a first case, the UE moves in the current coverage area of the micro cell, and therefore the coverage area of the micro cell may not be updated. Certainly, the network device may update the coverage area of the micro cell based on movement of the UE by using a micro device, so that the micro cell whose coverage area is updated can better provide a service for the UE.

In a second case, the UE moves in the coverage area of the micro cell that can be provided by the network device, and moves out of an original coverage area of the micro cell. In this case, the network device needs to update the coverage area of the micro cell and other configuration information based on a location of the UE, and keep the parameter used to trigger a handover procedure unchanged. Therefore, in this case, although the geographical location of the UE is moved to another coverage area, the UE does not need to be handed over between cells.

In the foregoing two cases, if a wireless communications system is the system shown in FIG. 2, the network device may be a micro base station, and the micro base station performs configuration update on the micro cell.

If a wireless communications system is the system shown in FIG. 3, the network device may be an independent network device such as a controller, or may be a macro base station in the prior art, and the independent network device or the macro base station performs configuration update on the micro cell by using a micro device. The micro device may be a micro base station, or may be an antenna cluster. If the micro device is a micro base station, the independent network device or the macro base station may perform configuration information update, or the micro base station may perform configuration update on the micro cell, or these devices may cooperatively perform configuration update on the micro cell. Specific processing of configuration update is described above, and details are not described herein again.

In addition, in the foregoing second case, if the coverage area of the micro cell changes, because micro cells that can be provided by different micro devices generally belong to different coverage areas, and the micro devices are controlled by a same network device, the network device can send information about the UE and information about the micro cell to another micro device; configure the micro cell for the UE by using the another micro device, where the coverage area of the micro cell may overlap a previous coverage area, or may be totally different from a previous coverage area; keep the parameter used to trigger a handover procedure unchanged; and maintain the connection between the micro cell and the UE based on the configuration information of the micro cell. It is easy to see that if a location of the micro cell is updated in the foregoing first case, this implementation solution may also be used in the foregoing first case. A specific implementation solution is similar, and details are not described herein.

In a third case, the UE moves out of the coverage area of the micro cell that can be provided by the current network device. In this case, the current network device needs to cooperate with another network device in the system, the another network device configures the micro cell for the UE, and the another network device keeps the parameter used to trigger a handover procedure unchanged. It should be noted that although the micro cell is configured by the another network device, the micro cell is still corresponding to the UE. In addition, because the parameter used to trigger a handover procedure is unchanged, the UE does not need to perform an inter-cell handover procedure even if the UE moves from the current network device to the another network device.

In the third case, there is interaction between different network devices. It is assumed that the network device includes a first network device and a second network device, a first micro device is connected to the first network device, and a second micro device is connected to the second network device. A micro cell that can be provided by the first micro device is corresponding to a first coverage area, and a micro cell that can be provided by the second micro device is corresponding to a second coverage area. Currently, the first network device configures the micro cell for the UE by using the first micro device.

Figure 5:
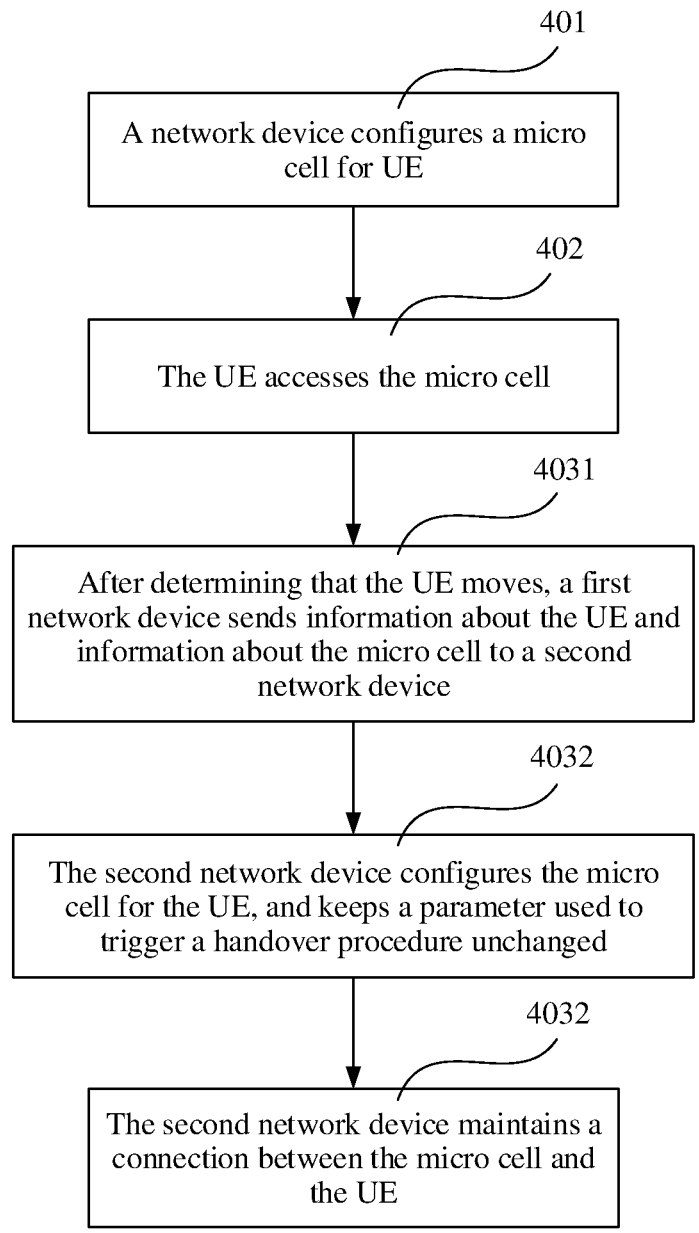
FIG. 5 is another schematic flowchart according to an embodiment of the present invention.
Figure 6:
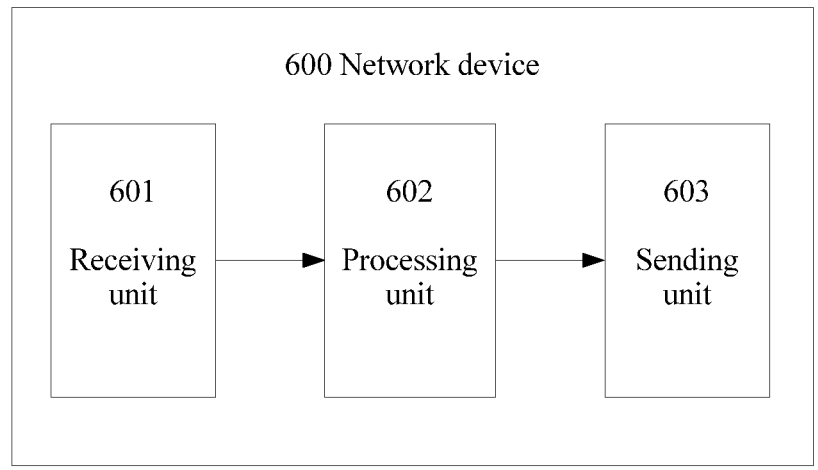
FIG. 6 is a schematic structural diagram of a network device according to an embodiment of the present invention.
Figure 7:
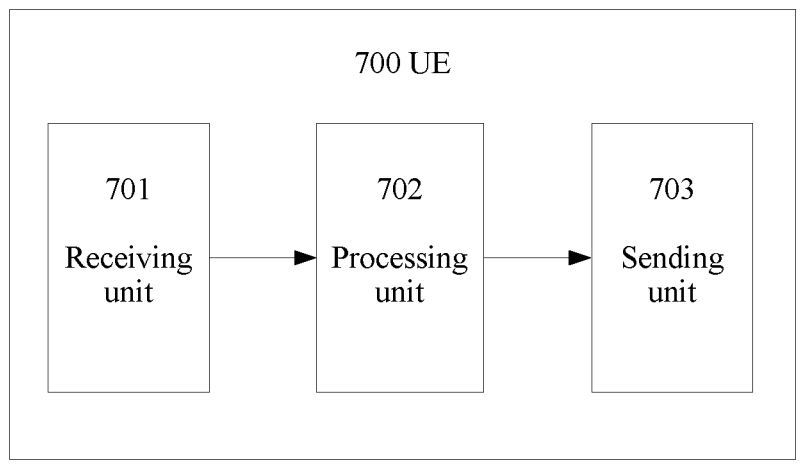
FIG. 7 is a schematic structural diagram of a terminal device according to an embodiment of the present invention.

Correspondingly, as shown in FIG. 5, step 403 may specifically include the following steps:

Step 4031: After the UE accesses the micro cell, and a first network device determines that the UE moves from a first coverage area to a second coverage area, the first network device sends information about the UE and information about the micro cell to a second network device.

Step 4032: The second network device configures the micro cell for the UE based on the information about the UE and the information about the micro cell, and provides the micro cell for the UE by using a second micro device, and the second network device keeps a parameter used to trigger a handover procedure of the UE unchanged, and maintains the connection between the micro cell and the UE based on the configuration information of the micro cell.

After the second network device maintains the connection between the UE and the micro cell configured by the second network device, the first network device may release the resource of the micro cell configured by the first network device in step 401.

In step 4031, the first network device actively sends the information about the UE and the information about the micro cell to the second network device. Alternatively, after the second network device determines that the UE moves into the second coverage area, the second network device may receive some information from the UE, and after receiving the information from the UE, obtain the information about the UE and the information about the micro cell from the first network device. The received information is described above, and for the information received from the UE, details are not described again.

In step 4032, the second network device may configure the micro cell for the UE after the UE moves into the coverage area of the second micro device. Alternatively, the second network device may first obtain the information about the UE and the information about the micro cell before the UE moves into the coverage area of the second micro device. Specific obtaining methods are the several methods described above. Then, the second network device configures, for the UE based on the information about the UE and the information about the micro cell, a micro cell that can ensure service continuity of the UE, provides the micro cell for the UE by using the second micro device, and keeps the parameter used to trigger a handover procedure of the UE unchanged. In this way, before the UE accesses the micro cell provided by the second micro device, the corresponding micro cell can be prepared for the UE, and no inter-cell handover is required. Therefore, the following problem does not occur: Due to a handover procedure, transmission of user plane data is interrupted, a large amount of handover signaling is increased, and the like. After the UE accesses the coverage area of the second micro device, the second network device may perform configuration update on the micro cell based on a measurement result and the like by using the second micro device, so that the micro cell can provide a better service for the UE. For an update method, refer to the foregoing micro-cell configuration update method. The configuration update may be adjusting the direction, the location, the width, the weight vector, or the like of the beamforming of the micro cell, and updating a radio bearer configuration parameter, to better provide a service for the UE. The measurement result may be a measurement result reported by the UE, or may be a result obtained after the second micro device measures a signal of the UE.

As described above, the wireless communications system in this embodiment of the present invention may be the system shown in FIG. 2 or FIG. 3. In the system shown in FIG. 2, the first network device and the second network device in steps 4031 and 4032 may be micro base stations, and the foregoing processing is directly performed by the micro base station.

In the system shown in FIG. 3, similarly, the first network device and the second network device in steps 4031 and 4032 may be independent network devices such as a controller, or may be macro base stations, and the independent network device or the macro base station may perform processing by using a micro device. The micro device may be a micro base station, or may be an antenna cluster. If the micro device is a micro base station, some control functions may be performed by the micro base station. For example, the second network device sends the information about the UE, the information about the micro cell, and the like to the second micro device, and configures the micro cell by using the second micro device. Signaling and/or data exchange between different network devices may be transmitted by using an X2/S1/OTA interface.

In addition, in the system shown in FIG. 3, if the network device includes a macro base station, the macro base station provides a macro cell. Therefore, when there is no service to trigger the UE, the UE may camp on the macro cell. When the UE has a service, the macro base station then sends the configuration information of the micro cell to the UE. In this manner, the network device does not need to allocate the micro cell to the UE when the UE accesses a network, so that resources of the micro cell are saved.

In this embodiment of the present invention, before the UE accesses the micro cell, the network device may further use a system message of the micro cell as the configuration information of the micro cell, and send the system message to the UE, so that the UE can quickly access the micro cell or select a suitable micro cell in a cell selection/reselection process. The system message of the micro cell may include at least one of the following items: a configuration parameter of a common feature of a plurality of micro cells covered by the network device, access information of a common feature of a plurality of micro cells, or access information of each of a plurality of micro cells. The access information may be capability information, information about a service that can be provided, a PLMN ID, TA code, carrier/frequency information, information about a working mode such as an FDD mode or a TDD mode, configuration information of a cell logical channel such as a BCCH, a RACH, or a PCCH, configuration information of a cell physical channel and cell signaling, for example, at least one piece of the following information: a PRACH, a PDSCH, a PUSCH, a PUCCH, a PDCCH, an enhanced physical control channel, reference signaling, power control, a CP length, antenna information, or beam optimization capability information, MBMS information, D2D information such as at least one of capability, resource, or synchronization information, timer information, or the like; and/or after the UE accesses the micro cell, the network device sends the configuration information of the micro cell to the UE. Before accessing the micro cell, the UE may obtain some basic configuration information of the micro cell from information such as the foregoing system message of micro cell, so that the UE can access the micro cell. After the UE accesses the micro cell, the network device sends more accurate configuration information to the UE, so that the UE can better interact with the micro cell based on the configuration information.

In addition, the foregoing uses the UE as an example for description. Actually, in a possible case in which a plurality of users move together, for example, move from one city to another city in a bus, UE of these users may be set as one UE group, and a micro cell is configured for the UE group. Specific processing is similar to the foregoing solution. Certainly, because one UE group has a plurality of UEs, a person of ordinary skill in the art knows that when performing processing, the network device may perform processing based on information about one UE, or may perform processing based on information about a plurality of UEs in the UE group, for example, obtain an average value, a maximum value, or a minimum value of the information.

The foregoing provides the method embodiment of the present invention. The following describes, with reference to the accompanying drawings, an apparatus corresponding to an embodiment of the present invention, such as a network device 600, UE 700, and a system.

The network device 600 in this embodiment of the present invention usually includes a sending unit 603 and a processing unit 602. The processing unit 602 is configured to: configure at least one micro cell for the UE, where the micro cell provides a service for only UE, and maintain a connection between the micro cell and the UE based on configuration information of the micro cell after the UE accesses the micro cell. The sending unit 603 is configured to send the configuration information of the micro cell to the UE.

The network device 600 may further include a receiving unit 601, configured to receive various types of information sent by a terminal device, and may further include a storage unit, configured to store context information of the UE and the like.

The network device specifically implements the solutions in the foregoing method embodiment. Therefore, the processing unit, the receiving unit, and the sending unit of the network device need to perform corresponding processing. Specifically, a step of sending information to the UE or another network device in the foregoing method embodiment is performed by the sending unit, a step of receiving information sent by the UE or another network device is performed by the receiving unit, and processing such as configuration and measurement is performed by the processing unit. Therefore, specific processing of each unit is not described in detail.

The UE 700 in this embodiment of the present invention usually includes a receiving unit 701, a processing unit 702, and a sending unit 703 configured to send information. The receiving unit 701 is configured to receive configuration information that is of the micro cell that is sent by a network device. The micro cell is a micro cell configured for the UE, and the micro cell provides a service for only the UE. The processing unit 702 is configured to: access the micro cell based on the configuration information received by the receiving unit, and maintain a connection between the UE and the micro cell based on the configuration information of the micro cell.

The UE specifically needs to implement the solutions in the foregoing method embodiment. Therefore, the processing unit, the receiving unit, and the sending unit of the UE need to perform corresponding processing. Specifically, a step of sending information to the network device in the foregoing method embodiment is performed by the sending unit, a step of receiving information sent by the network device is performed by the receiving unit, and processing such as access and measurement is performed by the processing unit. Therefore, specific processing of each unit is not described in detail.

For the network device and the UE, the processing unit, the sending unit, and the receiving unit may be a processor, a transmitter, and a receiver.

The system in this embodiment of the present invention may include the first network device and the second network device in the foregoing method embodiment. Specific processing of the two network devices is described in the foregoing method embodiment, and details are not described again.

Effects brought by the foregoing apparatus and system embodiments are described in the foregoing method embodiment, and details are not described again.

A person of ordinary skill in the art may understand that some steps in the foregoing method implementations may be implemented by using a program instructing relevant hardware. The program may be stored in a computer readable storage medium. When the program is executed, content of the implementations of the foregoing MIP technology-based communication method in the present invention may be included. The storage medium herein may be a ROM/RAM, a magnetic disk, an optical disk, and the like.

Although the present invention is illustrated and described with reference to some implementations of the present invention, a person of ordinary skill in the art should understand that various changes may be made to the form and details in the present invention without departing from the spirit and scope of the present invention.

What is claimed is:

1. A network device, comprising:
    a processor; and
    a non-transitory computer-readable storage medium storing a program to be executed by the processor, the program including instructions for:
        configuring one or more micro cells for a terminal device or a terminal device group comprising the terminal device, wherein the one or more micro cells provide a service for only the terminal device or the terminal device group;
        keeping a parameter used to trigger a handover procedure unchanged; and
        maintaining a connection between the one or more micro cells and the terminal device based on configuration information of the one or more micro cells after the terminal device accesses the one or more micro cells; and
    a sending circuit configured to send the configuration information of the one or more micro cells to the terminal device or the terminal device group.

2. The network device according to claim 1, wherein the instructions for configuring the one or more micro cells comprises obtaining information, and configuring the one or more micro cells based on the obtained information.

3. The network device according to claim 2, wherein instructions for configuring the one or more micro cells based on the obtained information comprises:
    determining receiving sectors and sending sectors of the one or more micro cells based on the obtained information by performing sector scanning, wherein the sector scanning is implemented by interacting between the network device and the terminal device or the terminal device group, wherein the interacting comprises transmitting or receiving of sector-related information, and wherein the sector-related information comprises: a control frame, a data frame, a sequence, a reference signal, a measurement result of a sequence, or a measurement result of a reference signal; or
    determining beamforming of the one or more micro cells based on the obtained information using a beam training process, and determining, in the beam training process, receiving beamforming and sending beamforming of the one or more micro cells by interacting between the network device and the terminal device or the terminal device group, wherein the interacting comprises transmitting or receiving of beamforming-related information, and wherein the beamforming-related information comprises: a control frame, a data frame, or a sequence; measurement results of a reference signal or a sequence related to beamforming and fed back by the terminal device or the terminal device group; or measurement results obtained after the network device measures a reference signal or a sequence related to beamforming.

4. The network device according to claim 2, wherein the program comprises further instructions for:
    performing configuration update on the one or more micro cells based on the obtained information, and keep the parameter used to trigger the handover procedure unchanged, wherein performing the configuration update on the one or more micro cells based on the obtained information comprises:
    updating receiving sectors and sending sectors of the one or more micro cells based on the obtained information by sector scanning, wherein the sector scanning is implemented by interacting between the terminal device or the terminal device group and the network device, wherein the interacting comprises transmitting or receiving sector-related information, and wherein the sector-related information comprises: a control frame, a data frame, a sequence, a reference signal, a measurement result of a sequence, and a measurement result of a reference signal; or
    updating beamforming of the one or more micro cells based on the obtained information using a beam training process, and updating, in the beam training process, receiving beamforming and sending beamforming of the one or more micro cells by interacting between the network device and the terminal device or the terminal device group, wherein the interacting comprises transmitting or receiving beamforming-related information, and wherein the beamforming-related information comprises: a control frame, a data frame, or a sequence; measurement results of a reference signal or a sequence related to beamforming and fed back by the terminal device or the terminal device group; or measurement results obtained after the network device measures a reference signal or a sequence related to beamforming.

5. The network device according to claim 2, wherein the instructions for configuring the one or more micro cells based on the obtained information comprises:
    obtaining a current channel condition of the terminal device or the terminal device group, a current location of the terminal device or the terminal device group, channel condition change information of the terminal device or the terminal device group, or location change information of the terminal device or the terminal device group;
    receiving information from the terminal device or the terminal device group using a receiving circuit of the network device; or
    receiving a reference signal from the terminal device or the terminal device group using a receiving circuit of the network device.

6. The network device according to claim 5, wherein the information received from the terminal device or the terminal device group comprises: a sequence, a measurement result of a sequence, a measurement result of a reference signal, a control frame, data, an ID of the terminal device or the terminal device group, dedicated code of the terminal device or the terminal device group, an index number corresponding to dedicated code of the terminal device or the terminal device group, cell code bound to the terminal device or the terminal device group, an index number of cell code bound to the terminal device or the terminal device group, or an ID of the one or more micro cells, wherein the ID of the one or more micro cells corresponds to the terminal device or the terminal device group.

7. The network device according to claim 1, wherein:
the program comprises further instructions for:
storing context information of the terminal device using a storage circuit of the network device;
after the terminal device has no service, continuing to store the context information using the storage circuit, and
after determining that the terminal device has a service, using the context information stored by the storage circuit to process the service for the terminal device;
the program comprises further instructions for:
after determining that the terminal device has no service, enabling the terminal device to camp on the one or more micro cells; or
the program comprises further instructions for:
after determining that the terminal device has no service and camps on the one or more micro cells, minimizing a transmit power of the one or more micro cells, and
after determining that the terminal device has a service, restoring the transmit power of the one or more micro cells.

8. The network device according to claim 1, wherein
the network device is a macro base station or a controller, and a first micro device and a second micro device are micro base stations or antenna clusters; or
the network device is a micro base station or a controller, and a first micro device and a second micro device are antenna clusters.

9. The network device according to claim 1, wherein the network device is a macro base station, the macro base station provides a macro cell, and the terminal device camps on the macro cell when there is no service to trigger the terminal device; and
the program comprises further instructions for when the terminal device has a service, sending the configuration information of the one or more micro cells to the terminal device by the sending circuit.

10. The network device according to claim 1, wherein:
the configuration information of the one or more micro cells comprises an identifier, access information, physical layer configuration information, higher layer configuration information, or measurement information of the one or more micro cells;
the identifier of the one or more micro cells comprises a sequence identifying the one or more micro cells, an index number corresponding to a sequence identifying the one or more micro cells, an ID of an antenna beam forming the one or more micro cells, a network device number, offset, or a dedicated ID of the terminal device or the terminal device group; and
the physical layer configuration information of the one or more micro cells comprises:
a reference signal or sequence of each of the one or more micro cells, a physical channel, antenna information, a scrambling sequence index (SCID), precoding information, channel matrix information, codebook information, layer information, a quantity of antenna ports, an antenna port number, beam optimization capability information, a valid time, valid duration, a control channel, a cyclic prefix (CP) length, or power control information, wherein the reference signal or sequence is used for cell synchronization, channel demodulation, channel evaluation, or radio resource management (RRM) measurement.

11. A wireless communications system, comprising:
a first network device corresponding to a first micro device, wherein one or more first micro cells provided by the first micro device corresponds to a first coverage area;
a second network device corresponding to a second micro device, wherein one or more second micro cells provided by the second micro device correspond to a second coverage area; and
wherein:
the first network device is configured to: configure, using the first micro device, the one or more first micro cells for a terminal device or a terminal device group comprising the terminal device, wherein the one or more first micro cells provide a service for only the terminal device or the terminal device group, and after the terminal device accesses the one or more first micro cells, and the first network device determines that the terminal device moves from the first coverage area to the second coverage area, send information corresponding to the terminal device and information corresponding to the one or more first micro cells to the second network device; and
the second network device is configured to: configure the one or more second micro cells for the terminal device based on the information corresponding to the terminal device and the information corresponding to the one or more first micro cells, provide the one or more second micro cells for the terminal device using the second micro device, keep a parameter used to trigger a handover procedure unchanged, and maintain a connection between the one or more second micro cells and the terminal device based on configuration information of the one or more second micro cells.

12. The wireless communications system according to claim 11, wherein
the second network device is configured to: configure the one or more second micro cells for the terminal device based on the information corresponding to the terminal device and the information corresponding to the one or more second micro cells, provide the one or more second micro cells for the terminal device using the second micro device, and keep a parameter used to trigger a handover procedure unchanged comprises:
before the terminal device enters the second coverage area of the second micro device, configure, for the terminal device based on the information corresponding to the terminal device and the information corresponding to the one or more second micro cells, one or more second micro cells that ensure service continuity of the terminal device, provide the one or more second micro cells for the terminal device using the second micro device, and keep the parameter used to trigger a handover procedure unchanged; and after the terminal device enters the second coverage area of the second micro device, perform configuration update on the one or more second micro cells based on a measurement result reported by the terminal device or a result obtained after the second micro device measures a signal of the terminal device, and keep the parameter used to trigger a handover procedure unchanged.

13. A terminal device, comprising:
a receiving circuit configured to receive, from a network device, configuration information of one or more micro cells, the one or more micro cells are configured for the terminal device or a terminal device group comprising the terminal device, and the one or more micro cells provide a service for only the terminal device or the terminal device group;
a processor; and
a non-transitory computer-readable storage medium storing a program to be executed by the processor, the program including instructions for:
accessing the one or more micro cells based on the configuration information received by the receiving circuit; and
maintaining a connection between the terminal device and the one or more micro cells based on the configuration information of the one or more micro cells, wherein a Parameter used to trigger a handover procedure is kept unchanged.

14. The terminal device according to claim 13, wherein the receiving circuit is further configured to receive first information sent by the network device using a plurality of sectors in a selectable area of the network device, wherein the first information is sector-related and comprises a control frame, a data frame, a sequence, a reference signal, a measurement result of a sequence, or a measurement result of a reference signal; and
the program comprises further instructions for determining, based on the received first information, a preferred sector of the plurality of sectors in which the network device has better sending performance than in remaining sectors of the plurality of sectors, and sending, by a sending circuit of the terminal device, first information related to the preferred sector or an identifier of the preferred sector to the network device.

15. The terminal device according to claim 13, wherein:
the program comprises further instructions for controlling a sending circuit of the terminal device to send first information to a plurality of sectors of the network device using a plurality of sectors in a selectable area of the terminal device or using a preferred sector of the plurality of sectors in which the network device has better sending performance than in remaining sectors of the plurality of sectors, wherein the first information is sector-related and comprises a control frame, a data frame, a sequence, a reference signal, a measurement result of a sequence, or a measurement result of a reference signal; and
the receiving circuit is further configured to receive first information related to a receiving sector of the network device or an identifier of a receiving sector of the network device sent by the network device after determining the receiving sector based on the first information.

16. The terminal device according to claim 13, wherein:
the receiving circuit is further configured to receive second information sent by the network device using a plurality of types of beamforming in a selectable area of the network device, wherein the second information is beamforming-related and comprises a control frame, a data frame, a sequence, a reference signal, a measurement result of a sequence, or a measurement result of a reference signal; and
the program comprises further instructions for determining, based on the second information received by the receiving circuit, a preferred beamforming of the plurality of types of beamforming in which the network device has better sending performance than in remaining beamforming of the plurality of types of beamforming, and sending, using a sending circuit of the terminal device, second information related to the preferred beamforming or an identifier of the preferred beamforming to the network device.

17. The terminal device according to claim 13, further comprising:
a sending circuit configured to send second information to a plurality of types of beamforming of the network device, wherein the second information is beamforming-related and comprises a control frame, a data frame, a sequence, a reference signal, a measurement result of a sequence, or a measurement result of a reference signal; and
wherein the receiving circuit is further configured to receive second information related to sending and receiving beamforming or an identifier of sending and receiving beamforming sent by the network device after determining the sending and receiving beamforming based on the second information.

18. The terminal device according to claim 13, further comprising:
a sending circuit configured to send information to the network device, wherein the information comprises:
a sequence, a measurement result of a sequence, a measurement result of a reference signal, a control frame, data, an ID of the terminal device or the terminal device group, dedicated code of the terminal device or the terminal device group, an index number corresponding to dedicated code of the terminal device or the terminal device group, cell code bound to the terminal device or the terminal device group, an index number of cell code bound to the terminal device or the terminal device group, or an ID of the one or more micro cells, wherein the ID of the one or more micro cells corresponds to the terminal device or the terminal device group.

19. The terminal device according to claim 13, wherein:
the configuration information of the one or more micro cells comprises an identifier, access information, physical layer configuration information, higher layer configuration information, or measurement information of the one or more micro cells;
identifiers of the one or more micro cells comprise a sequence used to identify the one or more micro cells, an index number corresponding to a sequence used to identify the one or more micro cells, an ID of an antenna beam that forms the one or more micro cells, a network device number, offset, or a dedicated ID of the terminal device or the terminal device group; and
the physical layer configuration information of the one or more micro cells comprises:
a reference signal or sequence of each of the one or more micro cells, a physical channel, antenna information, a scrambling sequence index (SCID), precoding information, channel matrix information, codebook information, layer information, a quantity of antenna ports, an antenna port number, beam optimization capability information, a valid time, valid duration, a control channel, a cyclic prefix (CP) length, or power control information, wherein the reference signal or sequence is used for cell synchronization, channel demodulation, channel evaluation, or radio resource management (RRM) measurement.

20. The terminal device according to claim 19, wherein:
the control channel in the physical layer configuration information uses an enhanced control channel; and the enhanced control channel implements a beamforming function and carries common or dedicated control information of the one or more micro cells.

* * * * *